June 18, 1968

W. D. MINSER 3,388,495

LEADER WITH COMPOSITE SLIDING LURE

Filed Aug. 24, 1966

William D. Minser
INVENTOR.

BY *Thomas A. O'Brien*
*and Harvey B. Jacobson*
Attorneys

United States Patent Office 3,388,495
Patented June 18, 1968

3,388,495
LEADER WITH COMPOSITE SLIDING LURE
William D. Minser, R.F.D. 1, Port Angeles, Wash. 98362
Filed Aug. 24, 1966, Ser. No. 574,725
7 Claims. (Cl. 43—42.05)

This invention relates, broadly classified, to fishing tackle, more particularly, a fishing line leader having a fishhook joined by a barrel-type swivel to its trailing end, and, in combination, an oscillatable lure slidingly mounted on the leader adjacent to and cooperable with the fishhook, said lure being unique and constituting the essence of the concept as will be hereinafter set forth.

As will be more fully understood from the following disclosure the tackle is characterized by an adaptation which is highly efficient and acceptable for use in lakes, rivers and salt water, is expressly designed and adapted for casting and spinning, and pertains to an adaptation which is unique in that when the fish is hooked the lure slides up the leader. In practice, regular nylon leader material is best used, this being important in that it enables the angler to tie the end of the leader to the swivel-equipped hook to premit the aforementioned slide action also to allow the user to change lures wih ease.

Persons conversant with the art to which the invention relates are aware that it is common practice to provide a fishing lure which is characterized by a plug of one type or another, whose leading or forward end is provided with an oblique angled diving and deflecting vane, and to provide an eye screw or the like at the leading end to which the leader is connected as shown, for example, in the patent to Matasay et al., 2,288,009. Many other examples could be but need not be cited. Nor is it new to provide a lure which is mounted on a leader in a manner to oscillate and which is also capable of being released and allowed to run free on the line or leader. Such an adaptation is revealed in my copending application for patent Ser. No. 457,655. With further reference to the preceding statement of the art it is to be pointed out that it is admittedly old to provide a conventional fishhook which is joined to the trailing end of a leader by a swivel and to associate the same with a plug unit characterized by an elongated tubular body or shank provided at a forward or leading end with an integral oblique angled vane or baffle which is shaped to achieve the desired animated, erratic and wobbling action.

To the ends desired, my prior adaptation embodies a flat-faced baffle which has an opening therethrough which provides for slidable passage of the leader. The baffle is provided on its rearward side with a tubular shank and, unlike the present invention, has an absorbent sleeve mounted thereon which has a forward end arranged to abut the oblique angled vane. Its rearward end extends beyond the corresponding end of the body to provide a socket in which the swivel is capable of being drawn and which stays put until the fish takes the hook, whereupon the baffle, shank, sleeve and streamer means (the over-all lure) is freed and allowed to slide up on and rotate relative to the leader.

The concept herein under advisement, and which is believed to be a meritorious solution of the problem, is unique and different. To the ends herein desired, and while the leader, hook and swivel is the same as in the copending matter, the two-part lure or plug is novel and different.

In carrying out the principles of the present invention, a composite lure is utilized and is characterized by a first component part, more particularly, a conventional-type cigar holder which embodies a hollow cup-like body portion which is open at its rearward end and has a closed forward end which merges into a reduced or forward end portion. This forward end portion has a restricted axial bore and constituting and providing a tip or mouthpiece for the cup-like holder. The companion or second component part embodies a shank which is such that it is fitted telescopingly, frictionally and retentively into the bore of the mouthpiece. The shank is provided at its leading end with an integral lure deflecting and animating vane or baffle which is oblique-angled. The closed end of the cup-like body portion has a restricted off-center aperture which provides one guide opening. The vane has at least one guide opening, preferably two, which is orientated and aligned with the first-named guide opening. Accordingly, longitudinally spaced coacting portions of the leader are threaded and pass freely and slidingly through the respective forward and rearward guide openings, whereby the direct pulling force of the leader is normally concentrated on and therefore imposed against the apertured portion of the cup-like holder. Accordingly, the over-all lure or plug is adapted to and capable of sliding, because of the threading of the line through the guide openings or holes, on and relative to the leader; that is, when the hook is taken by a fish.

More explicitly, novelty is predicated on the two component parts wherein one part comprises a throwaway cigar holder such as is used on Cigarillos and the like in combination with the shank which is characterized by a key-like tongue which is fitted into the bore of the mouthpiece and which has a semi-ovate or similar baffle with guide holes therein for the leader. It follows that the concept is such that cigar manufacturers may decide to make the cup portion of the cigar holder with a non-objectionable hole (which can be sealed or not) and to offer, as a premium or for a small extra charge (1) the complemental readily attachable baffle unit and (2) the hook-equipped leader.

It is also within the purview of the concept to simply use an ad and to tell the purchaser that the cigar holder is capable of reuse and to explain how the leader and baffle-equipped unit can be purchased separately for use by fishermen who smoke cigars and are given to the use of a lure which can be provided, on the spot, for fishing needs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
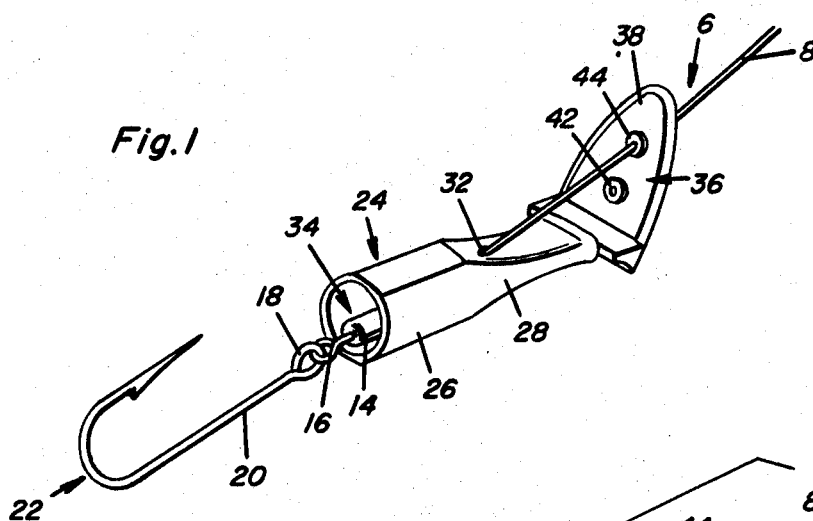
FIGURE 1 is a view in perspective showing the overall ready-to-use combination, that is, the hook-equipped leader and the two-part or composite lure mounted cooperatively thereon.
Figure 2:
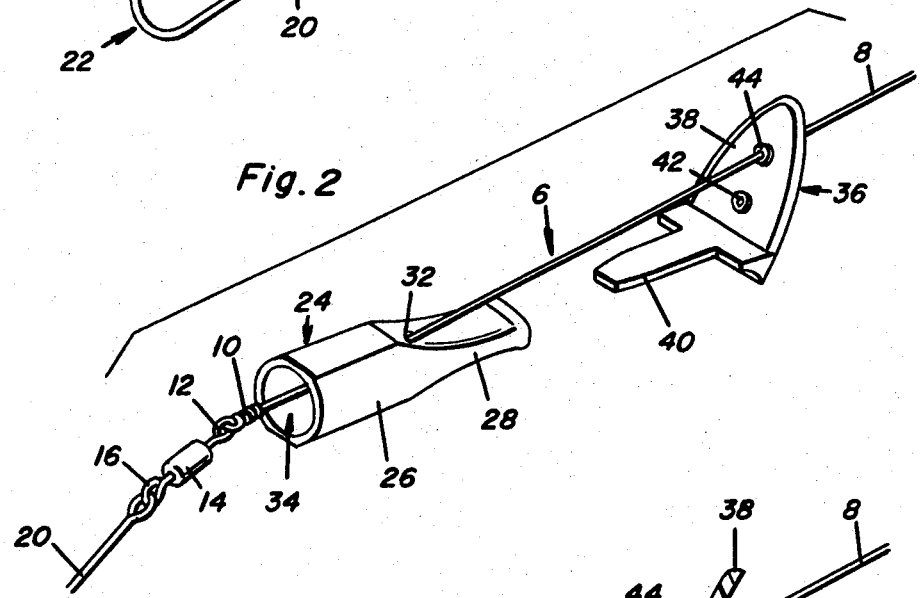
FIGURE 2 is a view also in perspective with the component parts of the two-part lure separated to show the construction thereof.

By way of introduction to the description of the details it is to be pointed out that the terms "lure" and "plug" are herein broadly and interchangeably used for the reason that while the trailing part of the composite lure takes the form of the aforementioned cigar holder, it is obvious that the concept should not be so limited for the reason that it is within the scope of the inventive concept to utilize component parts equivalent to those shown and herein both broadly and specifically described.

The aforementioned nylon or equivalent leader is denoted by the numeral 6 and is of suitable length, the forward end portion being denoted at 8 and the rearward end portion 10 being tied to the eye 12 of the barrel swivel 14, the complemental eye 16 being joined to a coacting eye 18 on the shank 20 of a conventional fishhook 22.

The first component part of the two-part or composite slidable and animated lure is denoted generally by the numeral 24 and may be a suitable hollow body of appropriate shape and color slidable on the leader in advance of the swivel means. More specifically, this part comprises the aforementioned cigar holder characterized by a hollow cup-like portion 26 and a reduced mouthpiece or mouth grip portion 28 which has a non-circular axial passage or bore 30 extending therethrough. At the juncture of the cup and neck a suitable offset leader guide opening is provided as at 32. It will be evident that it is within the purview of the invention to provide this opening at the time of manufacture and perhaps to cover it with a suitable detachable seal (not shown) or to simply mark the spot so that the angler can punch a hole (using a suitable instrument) if it is ultimately decided that such would be the most practical manner of reducing the invention to practice. In any event, the hollow portion 34 provides a space for accommodation of the tied end of the leader and the accompanying swivel means in the manner shown in FIG. 3. A second companion component part is also made of plastic or equivalent material and is denoted by the numeral 36 and comprises a semi-ovate flat-faced or equivalent baffle or vane 38 which is provided at one end with a reduced flat-faced suitable attaching and assembling tongue 40, said tongue being fitted telescopingly and frictionally and retentively into the bore 30 in the manner shown when the two component parts 24 and 36 are coupled together for use. The oblique angled baffle or vane is provided centrally with suitably spaced guide openings which are individually lined with suitably attached grommets. The bottom grommet or guide opening is denoted at 42 and the top one at 44.

Figure 3:
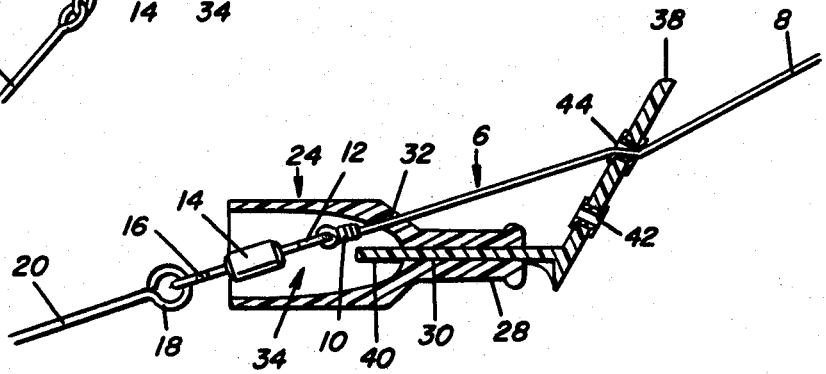
FIGURE 3 is a view in section and elevation which is based on and shows with particularity certain of the details not evident in FIGURE 1.

As shown in FIGS. 1 and 3, longitudinally spaced portions of the leader are threaded through the guide openings 32 and 44, for example, whereby to thus provide the ready-for-use assemblage illustrated in FIGS. 1 and 3. It will be evident that in the normal assemblage shown in FIG. 3 the point of pressure on the line is within the confines of the hollow portion 34, with the knotted end engageable with the apertured portion of the hollow body or cup 26. It follows that the pull is from the rear of the lure rather than from the front as is usually the case. Accordingly, when a fish strikes the hook, the lure is freed and allowed to run free, that is, slide, oscillate, or both, on the leader.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Fishing tackle of the class described comprising, in combination, a fishline leader, a fishhook carried by a swivel attached to the trailing end of said leader, a composite lure embodying a first component part having a hollow cup-like body portion open at its rearward end, substantially closed at its forward end and merging into a reduced forward terminal end portion having a restricted axial bore, a second component part complemental to said first component part and embodying a shank fitted telescopingly, frictionally and retentively into said bore, said shank provided at its leading end with an integral oblique angled lure deflecting and animating vane, the closed end of said cup-like body portion having a restricted offcenter aperture provided a guide opening, said vane having at least one guide opening orientated and aligned with said first named guide opening, longitudinally spaced portions of said leader threaded and passing freely and slidingly through said guide openings, respectively, whereby the direct pulling force of said leader is normally concentrated on and therefore imposed against the apertured portion of said first component part, the over-all lure being adapted and capable of sliding on and relative to said leader, that is, when the hook is taken by a fish.

2. The tackle according to claim 1, and wherein said vane is provided with a second guide opening, said vane guide openings being selectively individually usable.

3. The tackle according to claim 1, and wherein said vane is provided with a second guide opening, said guide openings being selectively usable, each guide opening being provided with a wear-resisting grommet.

4. The tackle according to claim 1, and wherein said shank is non-circular and constitutes and provides an assembling and keying tongue, said bore being of a shape and size to snugly receive and retentively but removably key said tongue in its intended place, whereby to thus separably couple said component parts together.

5. The tackle according to claim 4, and wherein said first component part comprises a molded plastic throwaway cigar holding tip.

6. A composite lure capable of being slidingly threaded on a hook-equipped fishing line leader comprising, in combination, a first component part having the shape of a cigar holder embodying a hollow cup-like body portion open at a rearward end and substantially closed at its forward end and merging into a reduced forward and terminal portion having a restricted axial bore, a second component part complemental to said first component part and embodying a shank fitted telescopingly, frictionally and retentively into said bore, said shank provided at its leading end with an integral lure deflecting and animating oblique angled baffle-type vane, the closed end of said cup-like body portion having a restricted offcenter aperture providing a guide opening, said vane having at least one guide opening orientated and aligned with said first-named guide opening.

7. The tackle according to claim 6, and wherein said shank is non-circular and constitutes and provides an assembling and keying tongue, said bore being of a shape and size to snugly receive and retentively but removably key said tongue in its intended place, whereby to thus separably couple said component parts together.

References Cited
UNITED STATES PATENTS

| | | | |
|---|---|---|---|
| 1,913,282 | 6/1933 | Major | 43—42.05 |
| 2,931,123 | 4/1960 | Jensen | 43—42.05 X |
| 3,010,243 | 11/1961 | Dickinson | 43—42.09 |
| 3,152,419 | 10/1964 | Jones | 43—42.23 X |
| 3,205,609 | 9/1965 | Knapton | 43—42.09 |

SAMUEL KOREN, *Primary Examiner.*

J. H. CZERWONKY, *Assistant Examiner.*